United States Patent
Di Taranto et al.

[11] Patent Number: 5,909,309
[45] Date of Patent: Jun. 1, 1999

[54] METHOD AND APPARATUS FOR CORRECTING GEOMETRICAL DISTORTIONS IN AN INTENSIFIED IMAGING SYSTEM

[75] Inventors: Gerard Di Taranto, Parsippany; Frank J. Vallese, West Orange; Michael Roselli, Nutley, all of N.J.

[73] Assignee: Electrophysics Corp., Fairfield, N.J.

[21] Appl. No.: 08/840,760

[22] Filed: Apr. 16, 1997

Related U.S. Application Data

[63] Continuation of application No. 08/359,064, Dec. 19, 1994, abandoned.

[51] Int. Cl.$^6$ .................................................... H01J 31/50
[52] U.S. Cl. ...................... 359/362; 359/363; 359/353; 359/405; 359/407; 359/410; 359/418; 359/672; 250/214 VT
[58] Field of Search ...................... 359/362, 363, 359/353, 405, 407, 410, 418, 419, 672; 250/214 VT, 219 VT, 213 VT, 214 LA

[56] References Cited

U.S. PATENT DOCUMENTS

| | | | |
|---|---|---|---|
| 3,803,407 | 4/1974 | Anderson | 250/213 VT |
| 3,863,166 | 1/1975 | Stimler | 359/346 |
| 3,971,933 | 7/1976 | Adamson et al. | 250/213 |
| 4,341,022 | 7/1982 | Santoro | 33/245 |
| 4,440,476 | 4/1984 | Jacobson | 313/524 |
| 4,822,994 | 4/1989 | Johnson et al. | 250/213 |
| 4,833,698 | 5/1989 | Flannery et al. | 378/19 |
| 5,373,320 | 12/1994 | Johnson et al. | 348/217 |

*Primary Examiner*—Cassandra Spyrou
*Assistant Examiner*—Mohammad Y. Sikder
*Attorney, Agent, or Firm*—Hoffman, Wasson & Gitler

[57] ABSTRACT

A method and apparatus to correct and eliminate optical anomalies and geometrical distortions in an intensified imaging system, specifically a night vision system. An image is received from the original objective lens assembly of an unintensified imaging system which, presumably, has been designed to produce images sized in accordance with the image sensor size of its host camera or camcorder. The format matching lens assembly receives the image from the original objective lens system and magnifies it so that it is output onto the entire circular active area of a mechanically inserted image intensifier. Having received an image across its entire circular active area, the image intensifier is able to amplify or intensify the image using the received light without creating any optical distortions. Once intensified without distortion, the image must be still further modified to fit its original format size. The relay lens assembly receives the intensified image from the mechanically attached image intensifier and demagnifies it so that it is output onto the entire circular active area of the lens of the host camera or host camcorder where it can be viewed with improved resolution and recorded without the presence of any optical distortions. Also, by receiving an image across its entire circular active area, the sensor, a CCD chip or like means inside a conventional camera or camcorder, is better able to optimize the resolution of the viewed object or activity.

11 Claims, 2 Drawing Sheets

METHOD AND APPARATUS FOR CORRECTING GEOMETRICAL DISTORTIONS IN AN INTENSIFIED IMAGING SYSTEM

This application is a continuation of application Ser. No. 08/359,064 filed on Dec. 19, 1994 abandoned on Apr. 17, 1997.

GOVERNMENTAL INTEREST

The invention described herein was not researched, designed, developed, tested or in any way created using monies derived or otherwise obtained though any Federally-sponsored research and development program. As such the rights to the invention are the sole property of the assignee, Electrophysics Corporation of Fairfield, N.J.

TECHNICAL FIELD OF THE INVENTION

This invention relates to night vision devices and more particularly to a method and apparatus for correcting geometrical distortions that occur in an image intensifier-based imaging system. It is to be noted, however, that the invention may find utility in other applications without departing from the spirit and intent of the invention.

BACKGROUND OF THE INVENTION

Various night vision devices are well known in the art. These devices are primarily, but not exclusively, used by law enforcement and military personnel to improve a user's ability to see during activities performed in low light conditions. Typically, night vision devices operate within the range of the electromagnetic spectrum where incident light has a wavelength of or between 400 to 1000 nanometers (nm). Many night vision devices incorporate a component known as an image intensifier. An image intensifier is a cylindrical assembly inside a tubular housing which multiplies or amplifies the amount of incident light it receives at one end, and outputs or transmits this amplified light directly to an ocular system located at its other end. The ocular system receiving the amplified or intensified light may be a camera or camcorder equipped with a sensor such as a CCD chip or like means, or in the case of specially adapted binoculars or telescopes, the human eye.

According to the present art of imaging systems, the incorporation of image intensifiers into an optical system always introduces optical anomalies and geometrical distortions. Typical of these optical distortions is the anomaly known in the art as "vignetting". Vignetting is illustrated in FIG. 1 and refers to the tunnel vision effect that occurs when images of differing format sizes are received by an optical system having a fixed image format. Invariably, vignetting distortions produce a dark or gray ring of non-illumination along the outer edge of the image. This ring of non-illumination is output onto part of the active circular area of the host camera or camcorder that could otherwise receive and record the viewed object or activity.

The present art of eliminating or preventing image distortions in an intensified imaging system makes use of various methods and techniques but is expensive to manufacture and cumbersome to implement. One method of correcting optical anomalies and geometrical distortions comprises means of an expensive tomography system which establishes an image's frame through the use of a computer and calibration object and then corrects vertical and horizontal distortions according to correction values that have been generated by the calibration process and stored in a computer. Another method has been to apply expensive electronic video hardware which applies vertical and horizontal blanking techniques which must be calibrated to achieve the exact superposition of multiple images to cancel or correct distortions. A third means has been the use or application of mirror subassemblies to split a color lens image into separate images and then electronically filter the separate images according to different requirements prior to recombining the images on a display monitor. Furthermore, geometric distortion-free images have been observed and recorded through an image intensifier by incorporating electronic sweep control circuits to alter the sweep pattern such that the electronic image representations generated by the video camera are distorted in a manner that is complementary to and cancels the distortion created by the image intensifier. As said before, each of these methods is expensive to manufacture and costly to implement. Some require a non-mobile or stationary environment to observe the object or activity under scrutiny. As a result of their cumbersome nature, the logistics of using such systems prohibits their application in a law enforcement or military environment.

Due to the frequency and various conditions under which the aforementioned users engage in nocturnal observations, a variety of image intensifiers are commercially manufactured. However, given the complex nature and construction of the individual components which comprise an image intensifier, it is cost prohibitive for a night vision manufacturer to produce a wide variety of image intensifying products to satisfy all the specific and fragmentary needs of the law enforcement and military markets. This economic constraint is made more acute by the fact that each different image intensifier is only capable of amplifying or intensifying images according to its particularly fixed image format. The fixed image format of an image intensifier is dictated by the mechanical dimensions and parameters of its lenses and accompanying optical apparatus which comprise the cylindrical assembly inside its tubular housing. As a method of distinguishing between the various sizes of image intensifiers, practitioners in the night vision art classify image intensifying hardware according to the diagonal measurement of the circular active area of the tubular housing. Simply put, this diagonal measurement determines the image format size of the image intensifier.

Similarly, other optical systems such as commercially available cameras or camcorders are manufactured in a wide and diverse variety. Because of larger economies of scale as well as less expensive construction costs of the necessary modules and related components, manufacturers of these photographic or video products can sustain the production of many various models which satisfy the specific needs of users despite the fact that each of these optical devices is also only able to produce images according to its particularly fixed image format. These optical products are typically offered for sale to ordinary persons to observe and record events which occur in daylight, near daylight or incandescent interior light conditions. Using the language of practitioners in the night vision industry, products which are only able to observe and record activities in daylight or near daylight conditions are referred to as "unintensified systems" because they are not primarily or especially designed to make use of the reduced light that is present during non-daylight hours. As one might expect, the image format size of an unintensified camera or camcorder system is dictated by the mechanical dimensions and parameters of the lenses and accompanying optical apparatus which comprise the means by which the camera or camcorder views or receives optical images. As a method of distinguishing between the various sizes of camera or camcorder products, practitioners in the art of photographic or video cameras classify optical hardware according to the diagonal measurement of the circular active area of the original objective lens assembly. In short, this diagonal measurement indicates the camera's or camcorder's image format size.

Given the nature of the imaging system art, any method or apparatus which easily and inexpensively incorporated the capabilities of an image intensifier with commercially available cameras or camcorders, without introducing the geometrical distortions that are inherent in an intensifier based imaging system, would be a welcome development. To this end, the present invention provides a night vision device wherein an unintensified imaging system is adapted to observe and record nocturnal activities by mechanically inserting means of an image intensifier and adjacent image correcting modules or subassemblies between the host camera's original objective lens system and the host camera itself. The adjacent image correcting modules or subassemblies are especially needed because of the particularly limited variety of image intensifiers that are presently available and the fact that optical distortions occur whenever an image intensifier having a fixed image format size is coupled with an unintensified lens system or lens assembly that has been designed to output images having a different image format size. These optical anomalies and distortions are geometrical in nature and occur primarily because the image output by the original objective lens system of the unintensified host camera or host camcorder fails to make use of the entire circular active area of the lenses and accompanying optical apparatus which comprise the image intensifier. Similarly, additional geometrical distortions and optical anomalies are produced whenever an image intensifier outputs an intensified image onto a lens system which has been designed to receive images of a different format size.

The present invention provides a new and inexpensive method and apparatus which prevents and eliminates optical anomalies and geometrical distortions.

SUMMARY OF THE INVENTION

According to the present invention, a night vision imaging system is provided. This system includes means of an original objective lens assembly which outputs an image along a lens light path, means of a format matching lens assembly which receives the image and which outputs a magnified image that makes use of the entire circular active area of the attached image intensifier which has a different image format size, means of an image intensifier which receives the magnified image across its entire circular active area and which outputs the amplified or intensified image to a relay lens assembly along the original lens light path, means of a relay lens assembly which receives the amplified or intensified image and which outputs a demagnified image along the original lens light path so as to be of the same image format size intended for the unintensified imaging system, means of a host camera or host camcorder which receives and records the intensified or amplified image without distortion according to its own image format requirements.

By using means of format matching lens assembly, means of an image intensifier and means of a relay lens assembly, an effective, relatively inexpensive, distortion-free imaging system having maximum resolution and sensitivity is provided.

An object of the present invention is to provide a method and apparatus for eliminating optical anomalies and geometrical distortions in an imaging system.

Another object of the present invention is to provide a method and apparatus for eliminating optical anomalies which occur when night vision imaging systems are used in reconnaissance and like activities.

A further object of the present invention is to provide a night vision imaging system, which is simple to fabricate, and which is relatively inexpensive to build, and which is easy to maintain, and which uses commercially available parts.

It is yet a further object of the present invention to provide a method and apparatus which prevent the occurrence of optical anomalies that would result whenever an image intensifier having a pre-defined image format is used in conjunction with camera systems or lens systems which produce images sized in accordance with a different image format size.

Additional objects and advantages of the invention will be set forth in the description which follows, and in part will be apparent from the description, or may be learned by practice of the invention. The objects and advantages of the invention may be realized and obtained by means of instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment and method of the invention and together with the general description and the preferred embodiment given below, serve to explain the principles of the invention. Of the drawings.

DETAILED DESCRIPTION OF THE PREFERRED EMBODIMENT

Reference will now be made in detail to a presently preferred embodiment of the invention as illustrated in the accompanying drawings.

Figure 1:
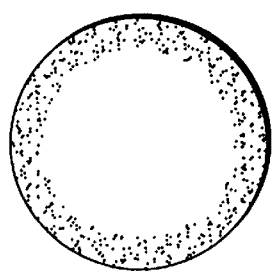
FIG. 1 is a drawing illustrating vignetting distortion in an optical system.
Figure 2:
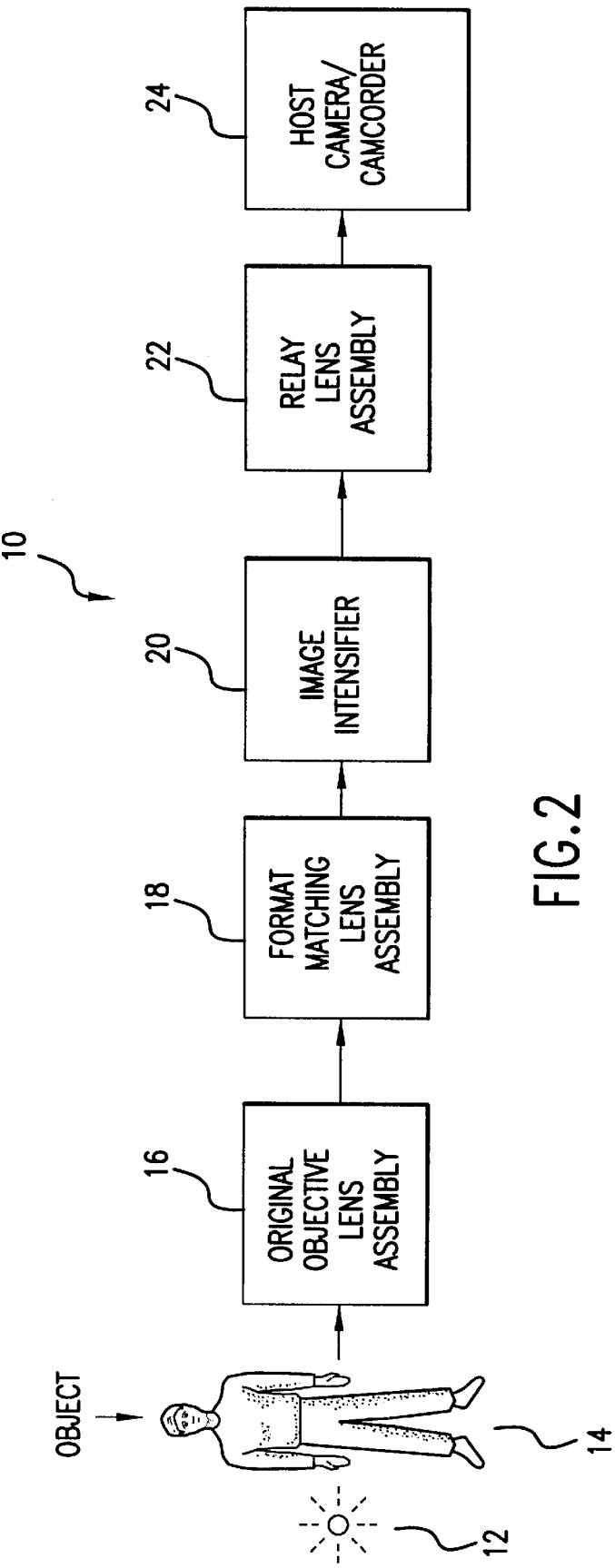
FIG. 2 is a block diagram of a distortion correcting imaging system in accordance with the present invention.

As shown in FIG. 2, an optical apparatus for a night vision camera system 10 is provided. System 10 includes source of low or reduced illumination emitting light at wavelengths of or between 400 to 1000 nanometers (nm) 12, object to be viewed, 14, original objective lens assembly 16, format matching lens assembly 18, image intensifier 20, relay lens assembly, 22, and host camera 24. Each of these components is mechanically attached to each adjacent component in accordance with conventional fastening techniques. At the user's option, host camera 24 could also be replaced by a host camcorder.

Figure 3:
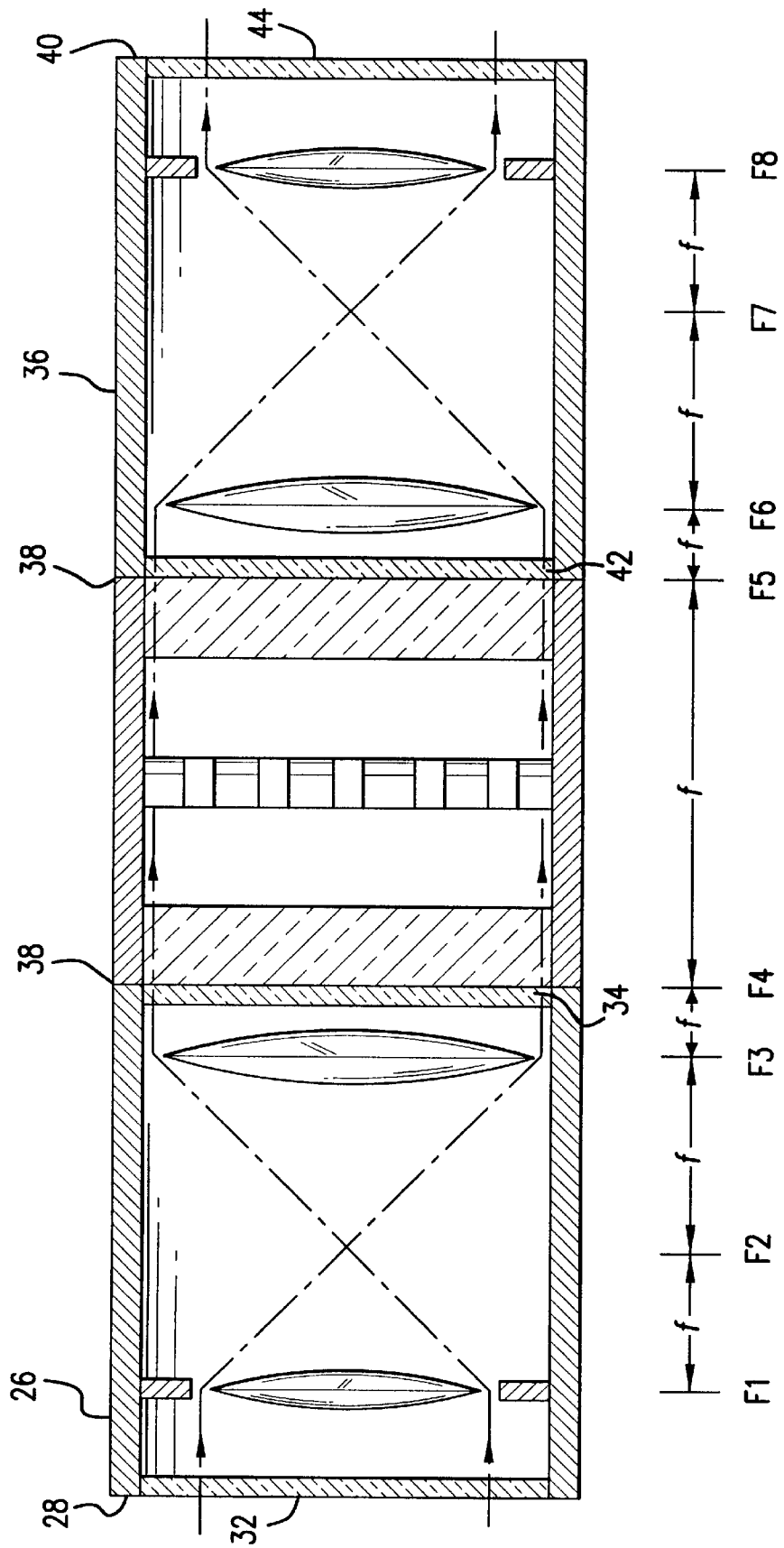
FIG. 3 is a pictorial depiction of a longitudinal cross section of the present invention.

With reference now to FIG. 3, the format matching lens assembly 18 may be located inside a substantially cylindrical tube 26 having a longitudinal axis coincident with the optic axes of the original objective lens assembly 16 and the host camera 24. The tube 26 may comprise a single piece of suitable material, such as plastic or metallic alloy, with a conventional means of fastening along either the interior or exterior of one open end 28 and a conventional means of fastening along the interior or exterior of the other open end 30. The first end 28 of the tube is open so that the format matching lens assembly 18 inside the tube can receive images of the object. The other end 30 of the tube is open so that the format matching lens assembly 18 inside the tube can output magnified images of the object to the image intensifier 20. Adjacent to the first end 28 may be a flat optically transparent plate 32. Adjacent to the other end 30 may be another flat optically transparent plate 34. Together, both plates 32 and 34 may seal the interior of the tube 26, which nay be nitrogen purged for protection from moisture.

The format matching lens assembly 18 may have an optic axis coincident with the longitudinal axis of the tube 26 and may sufficiently magnify the image received from the original objective lens assembly 16 so that it is projected or output onto the entire circular active area of the image intensifier 20.

The image intensifier 20 may be any intensifier suitable for night vision use in a video camera system. The image receiving section of the image intensifier 20 is located at focal plane F4. The intensification of the magnified image is done in accordance with conventional image intensification techniques. The image outputting section of the image intensifier 20 is located at focal plane F5.

The relay lens assembly 22 may be located inside a second substantially cylindrical tube 36 having a longitudinal axes coincident with the optic axes of the original objective lens assembly 16 and the host camera 24. The second tube 36 may comprise a single piece of suitable material, such as plastic or metallic alloy, with a conventional means of fastening along either the interior or exterior of one open end 38 and a conventional means of fastening along the interior or exterior of the other open end 40. The first end 38 of the second tube is open so that the relay lens assembly 22 inside the second tube can receive images of the object from the image intensifier 20. The other end 40 of the second tube is open so that the relay lens assembly 22 inside the second tube can output demagnified images of the object to the host camera 24. Adjacent to the second tube's first end 38 may be a flat optically transparent plate 42. Adjacent to the other end of the second tube 40 may be another flat optically transparent plate 44. Together, both plates 42 and 44 may seal the interior of the second tube 36, which may be nitrogen purged for protection from moisture.

The relay lens assembly 22 may have an optic axis coincident with the longitudinal axis of the second tube 36 and may sufficiently demagnify the image received from the image intensifier 20 so that it is returned to its original image format size and be completely projected or output onto the entire circular active area of the host camera 24.

The present invention has been described with reference to the preferred embodiment. Obviously, modifications and alterations will occur to others upon reading and understanding the preceding detailed description. It is intended that the invention be construed as including all such alterations and modifications insofar as the come within the scope of the appended claims or the equivalents thereof.

Having now described the preferred embodiment, we claim:

1. A method of correcting geometrical distortions, in an imaging system, consisting of:
   a) receiving an image along a lens light path;
   b) magnifying said image by a first format matching lens system provided along said lens light path, said first format matching lens system provided within a first cylindrical housing having a first distal opening and a first proximal opening, said first cylindrical housing being of a first diameter, said first format matching lens system including a lens provided close to said first proximal opening;
   c) intensifying said image on an image intensifier provided with a circular active area, said image produced by said magnifying step covering the entire surface area of said circular active area of said image intensifier;
   d) demagnifying said image, by a second relay lens system provided along said lens light path, to its original size, said second relay lens system provided within a second cylindrical housing having a second distal opening and a second proximal opening, said second cylindrical housing being of a second diameter equal to said first diameter, said second relay lens system including a lens provided close to said second proximal opening;
   e) outputting said image produced by said demagnifying step;
   wherein said image intensifier is provided between said first cylindrical housing and said second cylindrical housing.

2. A method in accordance with claim 1 wherein prior to said magnifying step, said image is received through an objective lens.

3. A method in accordance with claim 2 wherein the magnification of said first lens system is a function of the size of said image intensifier with respect to said objective lens.

4. A method in accordance with claim 3 wherein the demagnification of said second lens system is a function of the size of said objective lens with respect to said image intensifier.

5. A method in accordance with claim 3 wherein said image produced by said outputting step is projected onto a lens of a camera.

6. A method in accordance with claim 4 wherein said image produced by said outputting step is projected onto a lens of a camera.

7. An apparatus for connecting geometrical distortions in an imaging system, the apparatus consisting of:
   a) an image intensifier having a circular active area;
   b) a first cylindrical housing having a first distal opening and a first proximal opening, said first cylindrical housing being of a first diameter;
   c) a format matching lens system for receiving and magnifying an image, said format matching lens system provided in a lens light path in front of said image intensifier, said format matching lens system provided within said first cylindrical housing and including a lens provided close to said first proximal opening, said format matching lens system producing an image which covers the entire active area of said image intensifier;
   d) a second cylindrical housing having a second distal opening and a second proximal opening, said second cylindrical housing being of a second diameter equal to said first diameter; and
   e) a relay lens system provided in said lens light path behind said image intensifier for producing a demagnified image of said image covering the entire active area of said image intensifier, said relay lens system provided within said second cylindrical housing and including a lens provided close to said second proximal opening;
   wherein said image intensifier is provided between said first cylindrical housing and said second cylindrical housing.

8. The apparatus in accordance with claim 7, further including an objective lens provided in said lens light path in front of said format matching lens system, and further wherein the magnification of said format matching lens system is a function of the size of said image intensifier with respect to said objective lens and the demagnification of said relay lens system is a function of the size of said objective lens with respect to the size of said image intensifier.

9. The apparatus in accordance with claim 8 wherein said demagnified image produced by said relay lens system is projected onto a lens of a camera.

10. An apparatus for correcting geometrical distortions in an imaging system, the apparatus consisting of:

a) an image intensifier having a circular active area;
   b) a first cylindrical housing having a first distal opening and a first proximal opening, said first cylindrical housing being of a first diameter;
   c) a format matching lens system for receiving and magnifying an image, said format matching lens system provided in a lens light path in front of said image intensifier, said format matching lens system provided within said first cylindrical housing and including a lens provided close to said first proximal opening, said format matching lens system producing an image which covers the entire active area of said image intensifier;
   d) an objective lens provided in front of said format matching lens system;
   e) a second cylindrical housing having a second distal opening and a second proximal opening said second cylindrical housing being of a second diameter equal to said first diameter;
   f) a relay lens system provided in said lens light path behind said image intensifier for producing a demagnified image of said image covering the entire active area of said image intensifier, said relay lens system provided within said second cylindrical housing and including a lens provided close to said second proximal opening; and
   g) a camera provided with a lens onto which said demagnified image is projected;
       wherein said image intensifier is provided between said first cylindrical housing and said second cylindrical housing.

11. The apparatus in accordance with claim 10 wherein the magnification of said format matching lens system is a function of the size of said image intensifier with respect to said objective lens and the demagnification of said relay lens system is a function of the size of said objective lens with respect to the size of said image intensifier.

* * * * *